(12) United States Patent
Gupta

(10) Patent No.: US 7,010,656 B2
(45) Date of Patent: Mar. 7, 2006

(54) METHOD AND APPARATUS FOR MEMORY MANAGEMENT

(75) Inventor: Vivek G. Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 10/353,427

(22) Filed: Jan. 28, 2003

(65) Prior Publication Data
US 2004/0148481 A1    Jul. 29, 2004

(51) Int. Cl.
G06F 12/00    (2006.01)

(52) U.S. Cl. .......................... 711/165; 711/5; 711/154; 711/170; 711/202; 711/203; 711/206; 711/209; 713/324

(58) Field of Classification Search ................ 711/165, 711/5, 154, 170, 202, 203, 206, 209; 713/324
See application file for complete search history.

(56) References Cited

U.S. PATENT DOCUMENTS

| | | | | |
|---|---|---|---|---|
| 5,687,382 A | * | 11/1997 | Kojima et al. | 713/320 |
| 5,706,407 A | * | 1/1998 | Nakamura et al. | 700/251 |
| 5,928,365 A | * | 7/1999 | Yoshida | 713/324 |
| 6,115,799 A | * | 9/2000 | Ogawa | 711/171 |
| 6,167,484 A | * | 12/2000 | Boyer et al. | 711/106 |
| 6,215,714 B1 | * | 4/2001 | Takemae et al. | 365/222 |
| 6,430,665 B1 | * | 8/2002 | Allison et al. | 711/172 |
| 6,742,097 B1 | * | 5/2004 | Woo et al. | 711/170 |
| 6,757,806 B1 | * | 6/2004 | Shim | 711/203 |
| 6,845,432 B1 | * | 1/2005 | Maiyuran et al. | 711/154 |
| 6,877,098 B1 | * | 4/2005 | Lavelle et al. | 713/320 |
| 2002/0016883 A1 | * | 2/2002 | Musoll et al. | 711/100 |
| 2003/0023825 A1 | * | 1/2003 | Woo et al. | 711/170 |

OTHER PUBLICATIONS

Lebeck et al., "Power Aware Page Allocation," pp 105-116, ACM, Nov. 2000.*
Tech Note: "Rambus: Desktop Performance for Mobile PCs," pp 1-5, Rambus, Dec. 1999.*
Tanenbaum, "Structured Computer Organization, Third Edition," p 11, Prentice-Hall, Inc., 1990.*

* cited by examiner

Primary Examiner—Stephen C. Elmore
(74) Attorney, Agent, or Firm—Paul E. Steiner

(57) ABSTRACT

In some embodiments, an electronic device includes a processor, a physical memory coupled to the processor, and a storage medium coupled to the processor. The storage medium may store instructions which when executed by the processor cause the processor to: survey at least a portion of the physical memory, determine an amount of free memory space and used memory space based on the survey of the physical memory, determine if a consolidation of used memory space should be performed, and, if so determined, consolidate the used memory space, and reduce the power provided to at least a portion of the physical memory following the consolidation of used memory space. Other embodiments are disclosed and claimed.

15 Claims, 4 Drawing Sheets

METHOD AND APPARATUS FOR MEMORY MANAGEMENT

BACKGROUND

Handheld electronic devices have become increasingly commonplace in recent years. Handheld electronic devices may include, for example, personal digital assistants ("PDAs"), cellular telephones, pocket personal computers (PCs), or digital tablets. Such handheld electronic devices are typically microprocessor based, are equipped with one or more operating systems (e.g., Windows® CE™), and frequently include one or more types of memory resources, such as on-board read-only and/or random access memory, which may be either static and/or dynamic, or non-volatile and/or volatile, depending on the particular memory type. Additionally, these handheld electronic devices typically include one or more types of user input devices (e.g., touch screen, keypad) an output device such as a peripheral device (e.g., liquid crystal display), and may be provided power by one or more batteries or battery packs. The advantage of portability of these handheld devices often comes with related disadvantages, including limited computing power and memory resources, and a finite power life. Battery life, or power life, may depend not only on the type and/or size of battery used in a particular device, but also on the particular power management system utilized in the handheld electronic device, which may, for example, be imbedded software in the operating system. A handheld electronic device may contain one or more groupings of memory resources, which may be referred to as memory banks. Due at least in part to the characteristics of the memory banks, power may be continually provided to each memory bank. Reducing the power demands of one or more memory banks used by a handheld electronic device may result in a decrease in power consumption and an increase in overall battery life. A need therefore exists for a method of managing memory resources to reduce power consumption in a handheld electronic device.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
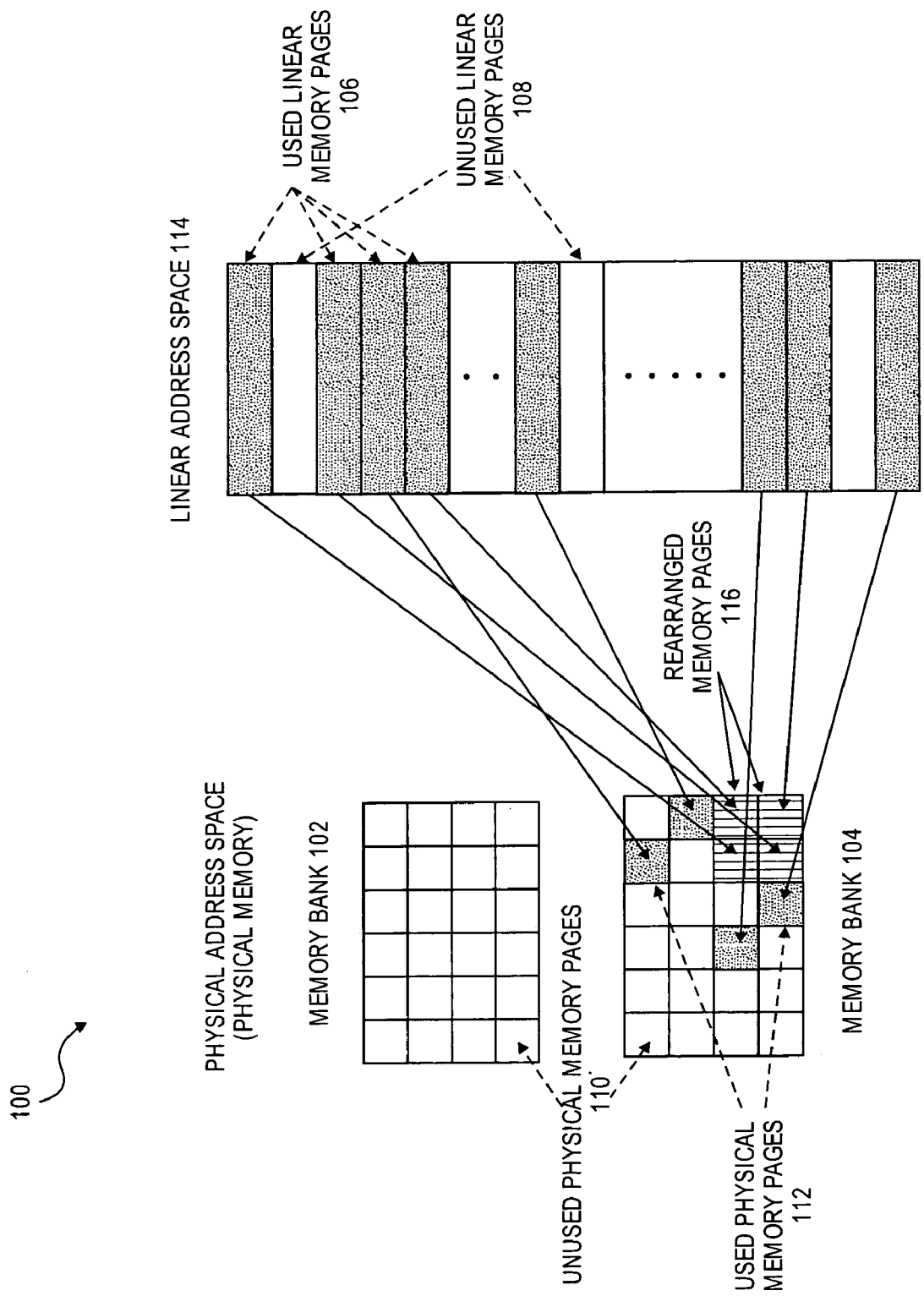
FIG. 1 is a schematic diagram illustrating one embodiment of the claimed subject matter.

In the following specification, numerous specific details are set forth in order to provide a thorough understanding of the claimed subject matter. However, it will be understood by those skilled in the art that the claimed subject matter may be practiced without these specific details. In other instances, well-known methods, procedures, and components will not be described in detail so as not to obscure disclosed embodiments of the claimed subject matter. Various aspects are described herein as discrete operations performed in a manner that is most helpful in understanding the claimed subject matter. However, the order of presentation should not be construed as to imply that these operations are necessarily performed in the order they are presented, or even order dependent. Additionally, it is important to note that any reference in this specification to "one embodiment" or "an embodiment" means that a particular feature, structure or characteristic described in connection with the embodiment is included in at least one embodiment of the claimed subject matter. The use of the phrase "one embodiment" in more than one place in the specification does not necessarily refer to the same embodiment.

Embodiments of the claimed subject matter may manage at least a portion of the physical memory of a handheld electronic device, resulting in a reduction of overall power consumption by at least a portion of memory resources of a handheld electronic device. As stated previously, handhold electronic devices may continually power a substantial portion of the device memory banks, regardless of usage or amount of data stored. As will be explained in more detail hereinafter, one embodiment of the claimed subject mailer may take advantage of virtual memory capabilities of the handheld electronic device to at least partially re-organize physical to linear memory mapping. This may result in less memory banks being used by the device, and a reduction in overall power demands. More specifically, one embodiment of the claimed subject matter, for example, may comprise a method of determining the amount of physical memory of a handheld electronic device currently being used to store data, determining the amount of memory capacity of the physical memory currently free or not currently being used to store data, transferring at least a portion of the data contained in the used memory to the free memory, and altering the power supplied to the free memory, may comprise a reduction or elimination of power. In this context, data may refer to one or more fragments of electronic data, which may be comprised of one or more digital data bits, and may comprise, for example, one or more software programs or one or more program fragments, or all or portion of a page load, to name just a few examples, but the claimed subject matter is not limited to these examples.

Alternatively, embodiments of the claimed subject matter may include the capability to determine one or more characteristics for one or more pieces of data stored in physical memory, and the capability to either delete, copy, and/or retain data, for example, based at least in part on one or more of these characteristics. Furthermore, utilization of one or more embodiments of the claimed subject matter may result in a decrease in overall power consumption of a handheld electronic device, as will be explained in more detail hereinafter.

A handheld electronic device, such as those previously described, may include one or more processors, such as microprocessors. An example of a microprocessor may include an Intel® Xscale™ microarchitecture based microprocessor. Handheld electronic devices may also include volatile and/or non-volatile memory. Memory may be organized as groupings of memory, such as one or more memory banks. Memory in these one or more banks may be comprised of one or more discrete memory chips. The one or more memory banks comprising one or more discrete memory chips may hereinafter be referred to as physical memory. One or more parts or portions of the physical memory may comprise memory, such as DRAM (dynamic random access memory), SDRAM (static DRAM), LP- SDRAM (low power SDRAM), for example. Additionally, the physical memory may reside within or on an integrated ASIC (application specific integrated circuit) or outside an ASIC, for example. A handheld electronic device processor may, during operation, interface with the physical memory in the handheld electronic device, in order to access at least a portion of the data in the handheld electronic device, for reasons including, but not limited to, page swapping, executing a program, and/or accessing data, for example. The physical memory may be comprised of multiple memory banks and/or multiple discrete memory chips for reasons such as flexibility of design and ability of designers to select appropriate memory capacity for the particular handheld electronic device, for example, although the claimed subject matter is not so limited.

As is well known, dynamic memory, also commonly referred to as volatile memory, uses a continual power source in order to retain data. In operation, dynamic memory may be utilized by a handheld electronic device to store downloaded programs, or may be used to execute user programs, store intermediate data and/or program state information, for example. In this context, this type of memory may be incorporated as RAM (random access memory), although the claimed subject matter is not so limited. The data retained in dynamic memory may not be critical to proper operation of a handheld electronic device, and may be deleted or discarded, and reproduced without significantly affecting operation of the handheld electronic device. Conversely, there may be some instances when dynamic memory may also store data such as system registry information, which is typically an aspect of operation of the handheld electronic device, and therefore this type of data is typically retained at all or nearly all times for proper operation of the device.

As stated previously, the hardware components, including the physical memory of a handheld electronic device, may be managed by an operating system such as Windows® CE™, SymbianOS, or Linux, for example. In a typical handheld electronic device, the operating system may interact with at least a portion of the physical memory to establish memory configuration, which typically entails setting such parameters as memory timing type, data bus width, and/or refresh rate, for example. Additionally, the operating system may incorporate one or more types of power management methods and/or power management logic. Power management logic may include the capability to transition one or more components of the handheld electronic device into a reduced power mode, which may be referred to, for example, as sleep state, idle, drowsy, and/or deep sleep, although the claimed subject matter is not so limited. Sleep state may be initiated based on a lack of use of the handheld electronic device over a particular period of time, for example. One or more components of the handheld electronic device, such as all or a portion of the physical memory, for example, may be placed into a low power auto refresh mode when the system is placed into a reduced power state. Handheld electronic devices may remain in a reduced power state for long periods of time, and physical memory may consume a not insignificant portion of battery power, even when it is in a reduced power mode such as a sleep state. Eliminating or reducing the power demands of physical memory of a handheld electronic device may increase the battery life and overall standby time of such a device.

Handheld electronic devices typically utilize one embodiment of the concept of virtual memory to map actions such as program requests to physical memory. Virtual memory allows the operating system (OS) to maintain a contiguous linear address space, which may provide benefits of a linear method of memory allocation, when the underlying memory is not being used in a linear or sequential fashion. This linear address space typically has a finite number of address positions, and a position is mapped to a particular location in physical system memory, usually based primarily on availability. The physical memory in a memory bank may be divided into smaller units called pages. The linear memory may also be similarly divided into smaller units called pages. The virtual memory or virtual memory system of the OS may map, or form an association between, physical pages to linear pages. During program execution, one or more linear pages may be allocated and then later freed. This may result in a segmented physical memory. Segmented physical memory may be inefficient, since allocation of memory space is not typically based on maximizing the use of each individual bank or discrete memory chip of the physical memory. This typical method of memory mapping may be at least partially illustrated by reference to FIG. 4.

Figure 4:
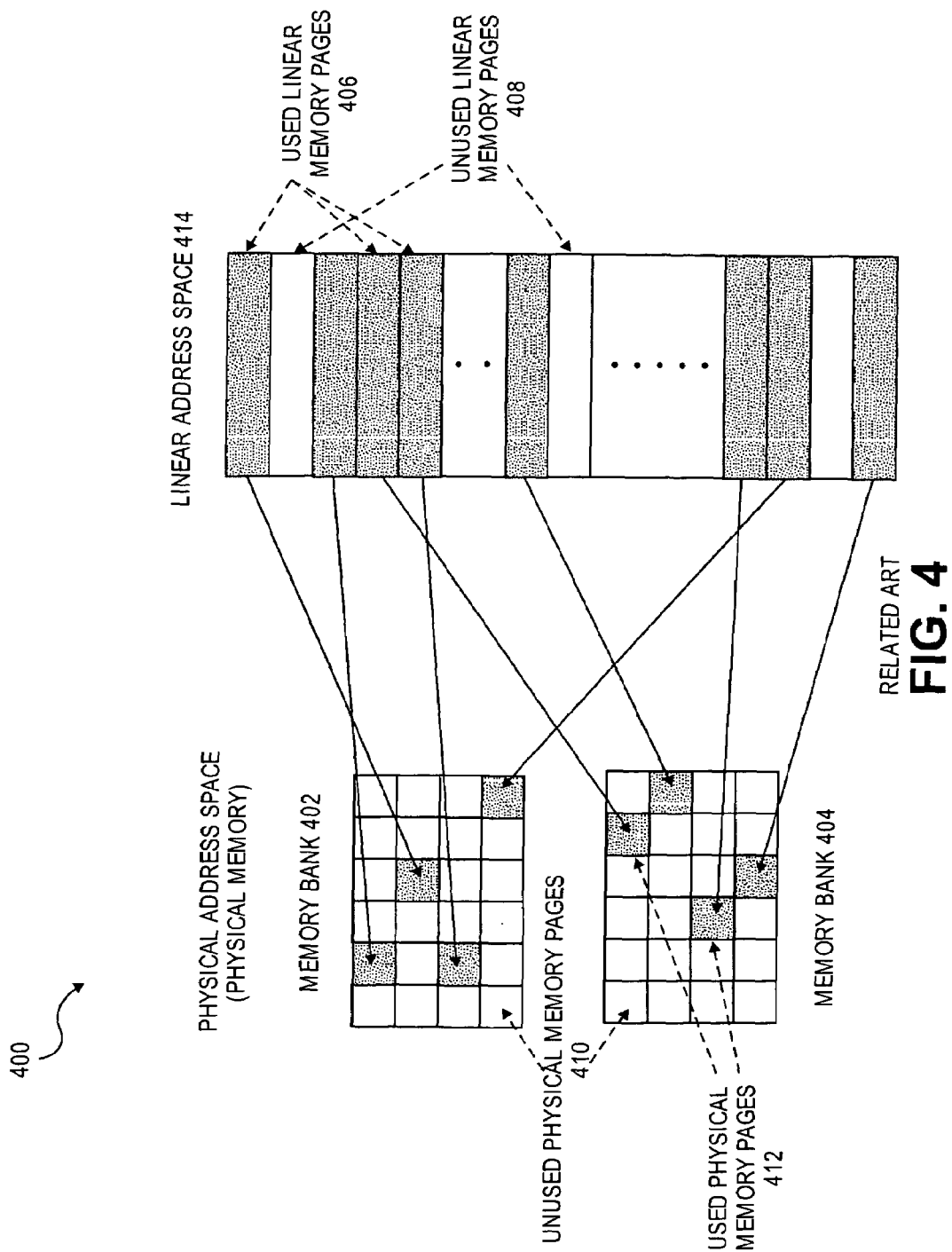
FIG. 4 is a schematic diagram illustrating a method of memory mapping.

Referring in detail now to the figures, wherein like parts are designated by like reference numerals, there is illustrated in FIG. 4 a schematic diagram illustrating one type of memory mapping method that may be utilized by the operating system of a handheld electronic device. The handheld electronic device physical memory illustrated in FIG. 4 is comprised of 2 memory banks, 402 and 404. These memory banks may be comprised of one or more discrete memory chips (not shown), as stated previously. In operation, one or more linear address spaces 414, such as unused linear memory pages 408, are allocated, or used, for actions such as program requests and/or data requests for example, but the claimed subject matter is not so limited as stated previously. These unused linear memory pages 408 therefore may become used linear memory pages 406, and may be mapped to one or more locations of physical memory, such as 410 and 412, where the data for actions, such as a program request, for example, are actually written into the one or more physical memory pages. As stated previously, the decision as to which physical memory page will receive the data depends, at least in part, upon the configuration of the memory, but availability is frequently a consideration. When executing a program, unused linear memory pages, such as linear memory pages 408, are not typically associated with a corresponding physical memory page, but may later become associated with one or more physical memory pages, such as physical memory pages 412, for example. Due at least in part to the memory mapping methodology used by the operating system, and/or by the rapid or numerous amount of memory mapping that takes place during operations such as program execution, the used and/or unused portions of physical memory remaining after one or more actions are executed may become segmented and/or non-uniform as shown in memory banks 402 and 404. This may result in continuous power being supplied to the memory banks, even if a portion of the physical memory is currently being utilized to store information from the memory banks 402 and 404.

In one embodiment of the claimed subject matter, a method of memory management may comprise consolidating data on to fewer memory banks or discrete memory chips of the physical memory, in order to provide for a power reduction or even elimination for at least a portion of the physical memory that may no longer be storing data for later retrieval. Additionally, as will be described in detail hereinafter, embodiments of the claimed subject matter may include a variety of features, such as the ability to discard non-essential or less useful data from physical memory based at least in part on the characteristics of the data, likewise, a full/empty ratio for at least a portion of the memory banks or discrete memory chips of a system may be determined, the desirability of consolidating one or more memory banks may be determined, at least a portion of the data may be consolidated and/or at least one memory bank or discrete memory chip may have its data transferred, although, these are just examples of features and the claimed subject matter is not limited in this respect.

FIG. 1 is a schematic diagram illustrating one embodiment of the claimed subject matter. The handheld electronic device at least partially illustrated in FIG. 1 has a physical memory comprised of 2 memory banks, 102 and 104. These memory banks may be comprised of one or more discrete memory chips (not shown). Additionally included in the physical memory is a table of address space 114, which may be comprised of one or more address pages, such as linear address pages, for example. The handheld electronic device physical memory illustrated in FIG. 1 is comprised of 2 memory banks, although, as stated previously, the claimed subject matter is not limited to any particular number of memory banks or to a device that uses banks of memory. In operation, one or more linear memory pages, such as linear memory pages 108, are allocated, or used, for actions such as program requests, as stated previously. These unused linear memory pages 108 may become used memory pages, such as memory pages 106, when they are mapped to one or more locations of physical memory 110 or 112, where the data for actions, such as a program request and/or data access, for example, are written into the one or more physical memory pages. As stated previously, the decision as to which physical memory page will receive the data depends upon the configuration of the memory, but is usually based on availability. When executing a program, several unused linear memory pages, such as linear memory pages 108, may be allocated. These used linear memory pages may be mapped to unused physical memory pages, such as memory pages 110. These memory pages may then become used physical memory pages, such as physical memory pages 112. As illustrated in FIG. 4, depending at least in part on the memory mapping methodology used by the operating system, and/or on the rapid or numerous amount of memory mapping that takes place during operations, such as program execution, the used and unused portions of physical memory, which may also be referred to as retained and available portions of memory, respectively, may become segmented and/or non-uniform across discrete memory banks. However, in this method of memory management, the physical memory may be at least partially re-arranged or consolidated at some point after at least a portion of the mapping has been performed, resulting in a more efficient and/or uniform use of the memory banks, as illustrated in FIG. 1. The rearranged physical memory pages 116 (as shown in FIG. 1) after consolidation may occupy a single memory bank 104 as opposed to multiple memory banks. An embodiment of a method of performing re-arranging or consolidation of memory such as illustrated in FIG. 1 may be illustrated by reference to flowchart 300 of FIG. 3.

Figure 3:
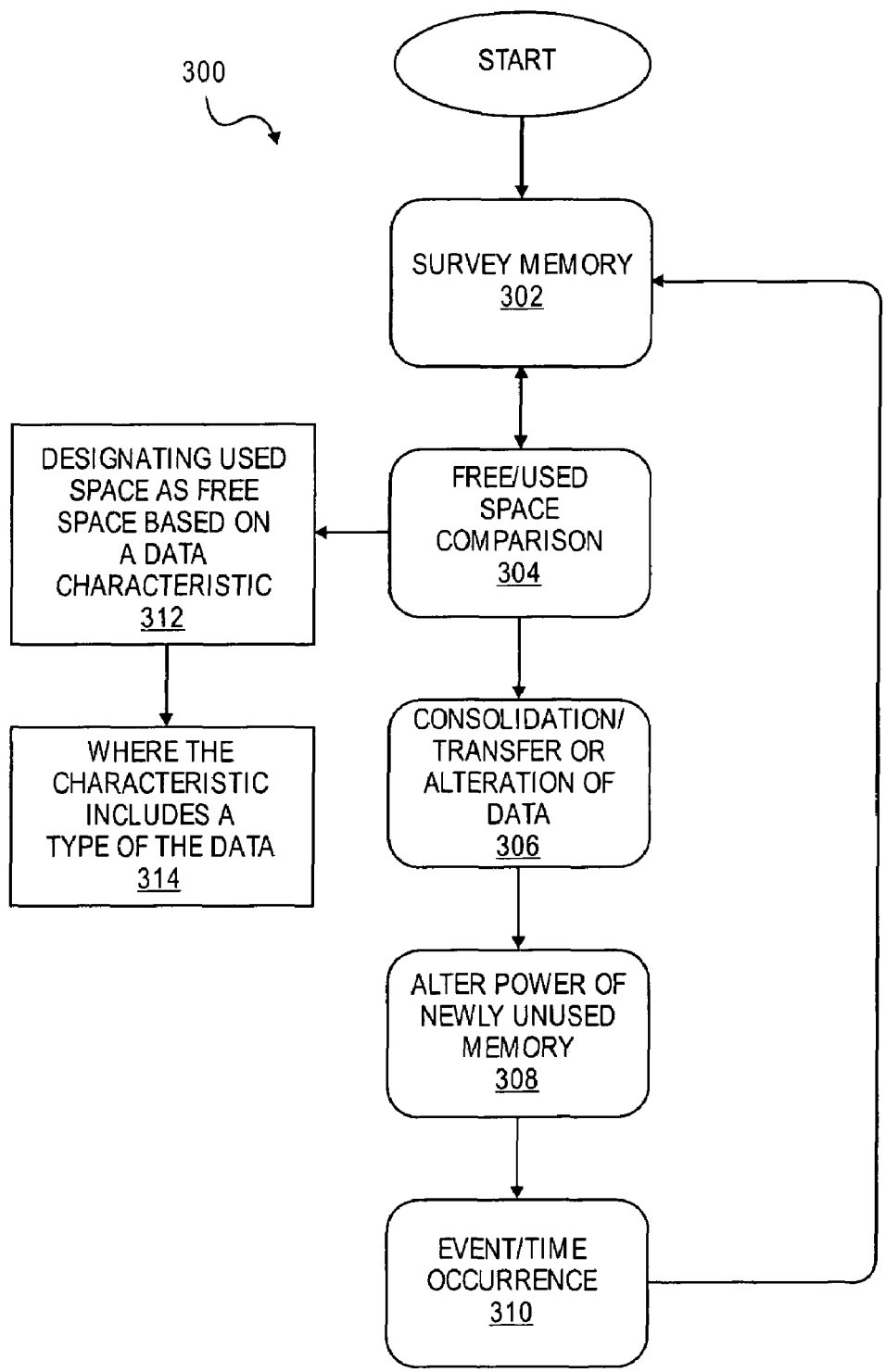
FIG. 3 is a block diagram illustrating one embodiment of the claimed subject matter.

FIG. 3 is a flowchart illustrating one embodiment of a method of memory management. Embodiments of the flowchart depicted in FIG. 3 may be implemented in software, hardware and/or firmware, and may comprise discrete operations, which may be well known to those of skill in the art. In accordance with flowchart 300, upon execution, the first functional block 302 includes the capability to survey of at least a portion of physical memory of a handheld electronic device. In this context, survey may comprise accessing at least a portion of the data retained in one or more memory banks, and determining one or more characteristics of at least a portion of the data. This survey may determine the amount of memory containing data to be retained and the amount of memory capacity available, or unused, in the handheld electronic device. The capability to survey may be limited to surveying a particular portion of the memory in the device, such as a memory bank designated for memory management, for example. Additionally, or conversely, in this functional block, survey may comprise a determination of the data to be retained and what data will not be retained, for example. This determination may be based on a variety of factors, such as the type of data stored, file type, data fragment size, date saved or created, last time data was accessed, and/or the particular source the data was derived from, such as a file from non-volatile storage, for example. Of course, this is not an exhaustive list of the potential factors that may affect the determination, and the claimed subject matter is not limited to a particular set of factors. The decision to retain or not retain a particular segment of data may be based at least in part on the impact of this particular segment of data in consideration on the proper operation of the handheld electronic device, for example, or may be a balancing of one or more factors, such as those mentioned previously, or may alternatively be determined by a user or other externally derived source, for example, although the claimed subject matter is not so limited.

In this embodiment, block 304 comprises a comparison of at least a portion of the data surveyed in block 302. This may be a comparison of the portion of memory used to retain data and the portion of memory not being used to retain data, which may also be referred to as used and available memory, respectively, or may determine if sufficient memory is consumed or fragmented to apply the mapping in this embodiment, for example. In this block 304 decisions such as which data to retain may be made based at least in part on one or more of the factors applied in block 302. For example, in block 312 a decision may be made to designate used memory space as free memory space based on a characteristic of data stored in the used memory space. For example, in block 314 the characteristic of data may include a type of the data stored in the used memory space. Additionally, a determination regarding the location to consolidate data may be made, as an alternative or an addition to the comparison described above. In alternative embodiments, likewise, block 304 may be omitted or skipped. This alternative approach may be used it for example, the survey performed at block 302 determined adequate information to perform the actions of functional block 306 without performing the functions of block 304, for example. In this context, free space may comprise memory space occupied by data that was designated for disposal in block 302, and/or used memory space may comprise memory space that is occupied by data designated for retention in block 302, for example.

Block 306 may perform actions based at least in part on determinations made in block 302, and/or block 304, as described previously. For example, if, at block 304, the determination was made to consolidate the data contained in two memory banks or memory chips, then the specific actions of transferring the relevant data from one bank to another is initiated at block 306. Additionally, blocks 302 and/or 304 may have determined that one or more of the memory banks of the physical memory of a handheld electronic device may contain data to be discarded, and this may be designated as free space for purposes, for example, of the free/used memory comparison. In this case, the functions performed at block 306 may include an altering of at least a portion of the data, for example, writing over a portion of the data in one or more physical memory locations, during the process of moving or consolidating data, although the claimed subject matter is not limited to these examples.

Block 308 may perform one or more power modifications of the one or more memory banks or discrete memory chips of a handheld electronic device. This power modification may be a elimination of power to all or a portion of the physical memory, or it may be a reduction of power, such as to a more reduced power state, such as deep sleep or drowsy state, for example, although the claimed subject matter is not so limited. The power modification may be based at least in part on one or more of the actions previously taken. These are just illustrations, however, and many embodiments of methods of altering the power are included within the claimed subject matter. Likewise, multiple power alterations may be made on one or more portions of the physical memory within the scope of the claimed subject matter, such as terminating the power to one portion and reducing the power to drowsy mode to another portion, for example.

In this embodiment, block 310 may include repeating or re-executing all or a part of flowchart 300, such as described above. For example, flowchart 300 may be repeated at the occurrence of some event, such as use of the handheld device by a user, for example. Alternatively, portions of flowchart 300 may be performed at various times such as, for example, after a particular period of time has elapsed, and/or after the device has a particular amount of power remaining. Likewise, these actions may be continually performed by the operating system during the normal course of operation, for example. A user or an external event may alternatively initiate this process as well, or a user may have the capability to determine one or more factors that may trigger a re-execution of portions of this embodiment. Thus, a variety of criteria or events may be used to trigger a re-execution of one or more of the operations described above in accordance with the claimed subject matter.

Figure 2:
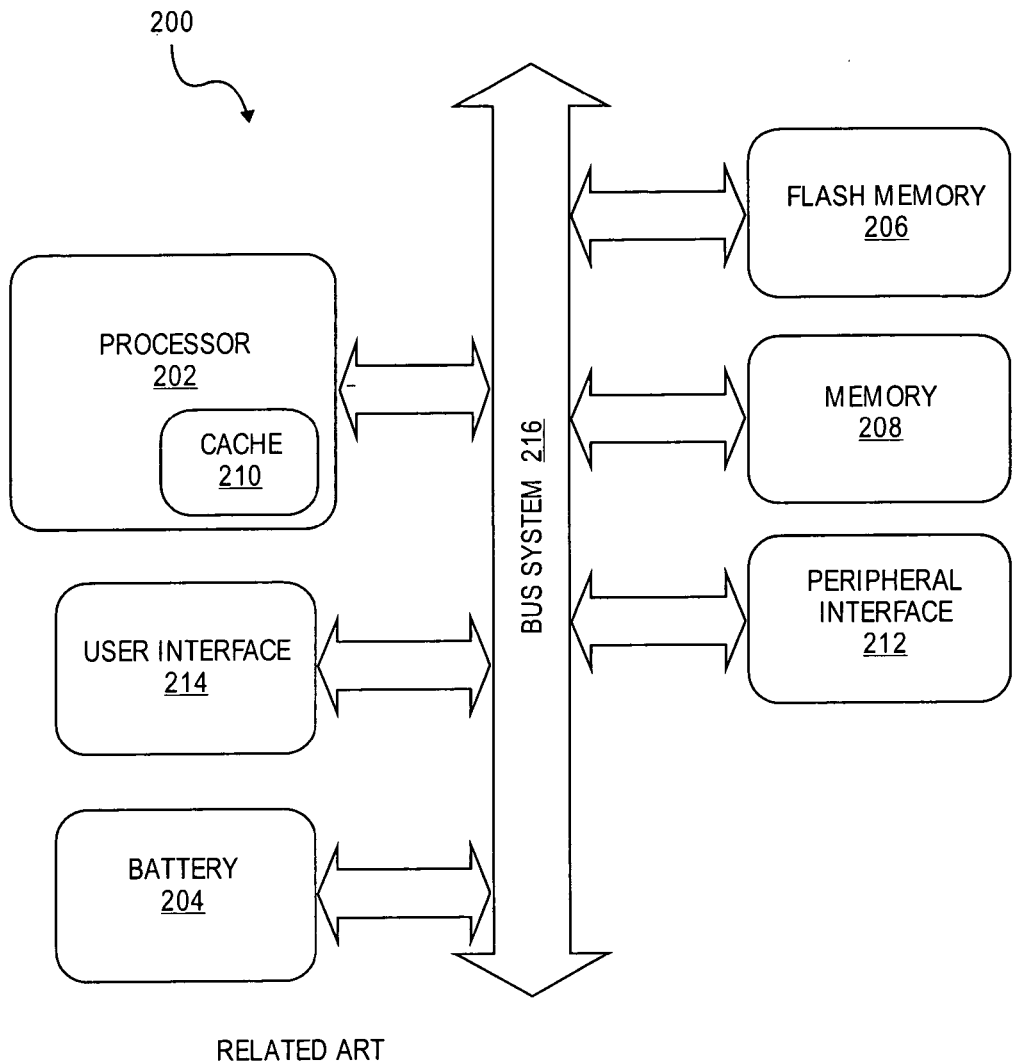
FIG. 2 is a schematic diagram illustrating one embodiment of the claimed subject matter.

A device capable of implementing embodiments of the claimed subject matter is illustrated in detail in FIG. 2. FIG. 2 shows a system 200 suitable for practicing at least one embodiment of the claimed subject matter. Furthermore embodiments of the claimed subject matter may be implemented in hardware, firmware or software, or any combination thereof, and such implementations may be embodied within system 200. Illustrated in FIG. 2 is one example of a handheld electronic device. Such handheld electronic devices are typically comprised of at least one processor 202, which may include cache memory 210. Additionally handheld electronic devices may be equipped with one or more operating systems (e.g., Windows CE) (not shown), and may include one or more types of memory resources, such as non-volatile memory 206, and/or memory 208, for example, which may comprise static and/or dynamic memory. Additionally, these handheld electronic devices typically include one or more types of user input devices or interfaces 214, an output device such as a peripheral interface 212, and may be powered by one or more batteries or battery packs 204. At least a portion of these components may be coupled together through a system bus 216, for example. Of course, it will be understood by those skilled in the art that the claimed subject matter is not limited to just handheld electronic devices. Any electronic device that utilizes at least one type of dynamic memory, where power conservation is desirable, may implement an embodiment within the scope of the claimed subject matter.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. A power management method, comprising:
   surveying at least a portion of a physical memory of an electronic device;
   determining an amount of free memory space and used memory space based on the surveying of the physical memory;
   determining if a consolidation of used memory space should be performed; and if so determined
   consolidating the used memory space; and
   reducing the power provided to at least a portion of the physical memory following the consolidation of used memory space.

2. The method of claim 1, further comprising:
   periodically performing the surveying and consolidating.

3. The method of claim 1, further comprising:
   performing the surveying and consolidating in response to a user initiated event.

4. The method of claim 1, further comprising:
   after the surveying and prior to consolidating the used memory space, designating at least some used memory space as free memory space based on a characteristic of data stored in the used memory space.

5. The method of claim 4, wherein the characteristic of data includes a type of the data stored in the used memory space.

6. An electronic device, comprising:
   a processor;
   a physical memory coupled to the processor; and
   a storage medium coupled to the processor, the storage medium storing instructions which when executed by the processor cause the processor to:
   survey at least a portion of the physical memory;
   determine an amount of free memory space and used memory space based on rite survey of the physical memory;
   determine if a consolidation of used memory space should be performed; and if so determined
   consolidate the used memory space; and
   reduce the power provided to at least a portion of the physical memory following the consolidation of used memory space.

7. The device of claim 6, further comprising instructions which cause the processor to:
   periodically perform the survey and consolidation.

8. The device of claim 6, further comprising instructions which cause the processor to:
   perform the survey and consolidation in response to a user initiated event.

9. The device of claim 6, further comprising instructions which cause the processor to:
   after the surveying and prior to consolidating the used memory space, designate at least some used memory space as free memory space based on a characteristic of data stored in the used memory space.

10. The device of claim 9, wherein the characteristic of data includes a type of the data stored in the used memory space.

11. A machine-readable medium, having stored thereon instructions which when executed by a computing system including a physical memory cause the computing system to:
- survey at least a portion of the physical memory;
- determine an amount of free memory space and used memory space based on the survey of the physical memory;
- determine if a consolidation of used memory space should be performed; and if so determined
- consolidate the used memory space; and
- reduce the power provided to at least a portion of the physical memory following the consolidation of used memory space.

12. The machine-readable medium of claim 11, further comprising instructions which cause the processor to:
periodically perform the survey and consolidation.

13. The machine-readable medium of claim 11, further comprising instructions which cause the processor to:
perform the survey and consolidation in response to a user initiated event.

14. The machine-readable medium of claim 11, further comprising instructions which cause the processor to:
after the surveying and prior to consolidating the used memory space, designate at least some used memory space as free memory space based on a characteristic of data stored in the used memory space.

15. The machine-readable medium of claim 14, wherein the characteristic of data includes a type of the data stored in the used memory space.

* * * * *